United States Patent [19]

Baunack

[11] 4,354,439
[45] Oct. 19, 1982

[54] METHOD OF AND A DEVICE FOR FEEDING SOLID FUEL IN A FLUIDIZED BED HEARTH

[75] Inventor: Fritz Baunack, Bad Hersfeld, Fed. Rep. of Germany

[73] Assignee: Babcock-BSH AG vormals Büttner-Schilde-Haas AG, Krefeld, Fed. Rep. of Germany

[21] Appl. No.: 154,304

[22] Filed: May 29, 1980

[30] Foreign Application Priority Data

Jun. 8, 1979 [DE] Fed. Rep. of Germany ....... 2923250
Oct. 5, 1979 [DE] Fed. Rep. of Germany ....... 2940358

[51] Int. Cl.³ .............................................. F23G 5/00
[52] U.S. Cl. ..................................... 110/245; 110/347
[58] Field of Search ................ 122/4 D; 110/245, 347

[56] References Cited

U.S. PATENT DOCUMENTS

| | | | |
|---|---|---|---|
| 2,121,733 | 6/1938 | Cottrell | 122/4 D |
| 2,884,373 | 4/1959 | Bailey | 122/4 D |
| 3,397,657 | 8/1968 | Tada | 110/245 |
| 3,902,462 | 9/1975 | Bryers | 110/245 |
| 3,967,975 | 7/1976 | Idaszak | 110/264 |
| 3,991,816 | 11/1976 | Klaren | 122/4 D |

FOREIGN PATENT DOCUMENTS

| | | | |
|---|---|---|---|
| 54-16730 | 2/1979 | Japan | 110/245 |
| 2034448 | 6/1980 | United Kingdom | 122/4 D |

Primary Examiner—Henry C. Yuen
Attorney, Agent, or Firm—Michael J. Striker

[57] ABSTRACT

In the method of feeding pulverized solid fuels into a fluidized bed hearth, the granular solid fuel is first delivered into a fuel distributing space where it is fluidized by means of a whirling stream of air and the fine granular components of the fluidized fuel are pneumatically fed through an array of feeding pipes into the fluidized bed formed in the combustion space of the hearth. The device for performing the method includes heat-resistant feeding pipes uniformly distributed between the combustion space and projecting into the fuel distributing space to immerse into the fuel distributing fluidized bed of fuel. The fluidizing air of stream is introduced into the distributing chamber to act both as the fuel conveying medium and as a combustion air in the combustion space.

6 Claims, 4 Drawing Figures

FIG I

METHOD OF AND A DEVICE FOR FEEDING SOLID FUEL IN A FLUIDIZED BED HEARTH

BACKGROUND OF THE INVENTION

This invention relates generally to fluidized bed hearths designed for burning very finely divided solid fuels such as for example flotation wastes or separation sludges, and in particular to a method of and a device for feeding such solid fuels into the fluidized bed hearth.

In solid fuel fired hearths of this type which use the very finely divided fuel material, feeding problems frequently occur which impede the proper operation of the hearth. Normally, it is desired that in order to achieve a simple operation of the combustion process proper and an improved binding of undesired component parts such as sulfur from the exhaust gas into the slag or ashes it is desirable to feed a moisture-free solid fuel such as coal, for example.

The dry solid fuel, however, cannot be fed on the fluidized bed simply from above since in this case it would burn only incompletely and would have to be returned into the combustion fluidized bed for additional burning. As a consequence, a high recycling ratio of the fed fuel would result.

Conventional mechanical or pneumatical feeding of the fuel into the lower portion of one side of the combustion part of the fluidized bed is applicable for small fluidized bed hearths only. In the case of large sized fluidized beds the mixing effect in horizontal plane is too small for achieving a satisfactory combustion of the fed-in fuel.

It is true that it is possible to feed the finely divided fuel via nozzles similarly as it is known in the case of liquid or gaseous fuels, nonetheless due to the necessary distribution of the fuel an excessive number of such nozzles would have to be employed and this solution therefore would become too expensive. In addition, due to the high contents of flyash in the recycled fuel returned by pneumatic conveying means which is to be provided with a plurality of branches with distributors and elbow pipes, a considerable wear of the conveying system would result.

Some of the known fuel feeding devices for the fluidized bed hearths are described in an article "Dampferzeuger mit Wirbelschichtfeuerung unter atmosphärischen und Überdruckbedingungen" in a printed copy 41/5/78/2000/d of the firm Vereinigten Kesselwerke Ag, Düsseldorf, Federal Republic of Germany.

SUMMARY OF THE INVENTION

A general object of the present invention is to overcome the aforementioned disadvantages of prior art feeding devices of this kind.

More particularly, it is an object of the invention to provide an improved fuel feeding device for fluidized bed hearths which does not require an excessive number of feeding nozzles and which is not susceptible to excessive wear.

In keeping with these objects, and others which will become apparent hereafter, the method of this invention is characterized by the steps of feeding the solid fuel into a distributing part of the fluidized bed hearth where the fuel is fluidized in a whirling stream of gas and thereupon the fluidized fuel is pneumatically conveyed into the combustion part of the hearth.

The feeding device of this invention is characterized by an array of pipes interconnecting the top portion of the distributing part of the hearth with the bottom portion of the combustion part of the hearth whereby the whirling fluidized solid fuel is pneumatically discharged from the distributing part into the combustion part.

Preferably, the distributing part of the hearth is separated from the combustion part by a bottom plate separating the array of interconnecting pipes whereby the finely divided fluidized component of the solid fuel is conveyed by the whirling gas through the pipe into the combustion space of the hearth.

If the fuel fed into the distributing part of the hearth includes a wide range of grain sizes, the coarse grains of the fuel are separated in the distributing part from the fluidized fine grains and are fed into the combustion part by separate feeding ducts.

The whirled gas introduced into the distributing part to fluidize the solid fuel is preferably whirling air acting as the conveyor gas for the finely granulated fuel components which act simultaneously as the combustion air in the combustion part of the fluidized bed.

Nonetheless, it is possible to use for the pneumatic feeding of the finely granulated fuel a separate stream of conveying gas which is controlled independently from the system of combustion gas or air streams. The stratification has the advantage that the ratio between the fed fuel and air can be adjusted in very broad limits independently one from the other.

The fine control of the combustion process in the combustion part of the fluidized bed can be carried out according to the method of this invention apart from controlling the amount of fuel supplied into the distributing part of the fluidized bed for example in the following manner:

The more the lower ends of the connecting pipes for the pneumatic feeding approach the upper surface of the fluidized layer of fuel in the distributing part of the hearth or the more immerse into this layer at a constant supply of conveying gas or air, the more fuel is supplied into the combustion part of the bed. This control in practice is realized by changing either the height of the fluidized bed or by lifting or lowering the conveying connection pipes.

It is also possible in order to control the efficiency of the hearth, preferably when separate fuel feeding is employed, to close more or less the inlet openings of the fuel conveying connecting pipes or the inlet openings for the infiltrated air.

In another modification of the method of this invention the fuel is fed from a fuel distributing part of the fluidized bed which is arranged above the combustion part of the bed via overflow or gravity pipes projecting into the combustion part of the fluidized bed and the fuel is fed into the combustion part by means of a whirling or conveying medium admitted into the distributing part.

Preferably, the stream of air is employed as the whireling and conveying medium; nonetheless it is also possible to use another kind of gas or gas mixture.

Preferably, the introduced whirling air serves simultaneously as the conveying air for the fluidized fuel and at the same time as the combustion air for the burning process in the combustion part.

The feeding of gas for the two parts of fluidized bed is effected via separately controllable conduits whereby the required amounts of gas are withdrawn from branches of a common gas supply system or alternatively via two separate gas supply devices which are adjustable independently from one another.

The allotment or distribution of the whirled gas or air is adjusted proportionally to the size of fluidized bed and in accordance with the required amount of the combustion air.

In carrying out this invention it is of advantage when the fuel distributing part of the fluidized bed is operated with a reduced height of the whirling fluidized layer and at an increased whirling speed of the conveying gas.

The fuel feeding pipes which are designed as overflow or gravity pipes known per se are made preferably of a ceramic material or have a double wall structure cooled by the combustion gas or by water.

In order to achieve a uniform distribution of the fluidized fuel, reflecting or distributing elements can be arranged in the combustion part of the fluidized bed opposite the projecting ends of the conveying pipes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE PREFERRED EMBODIMENTS

Figure 1:
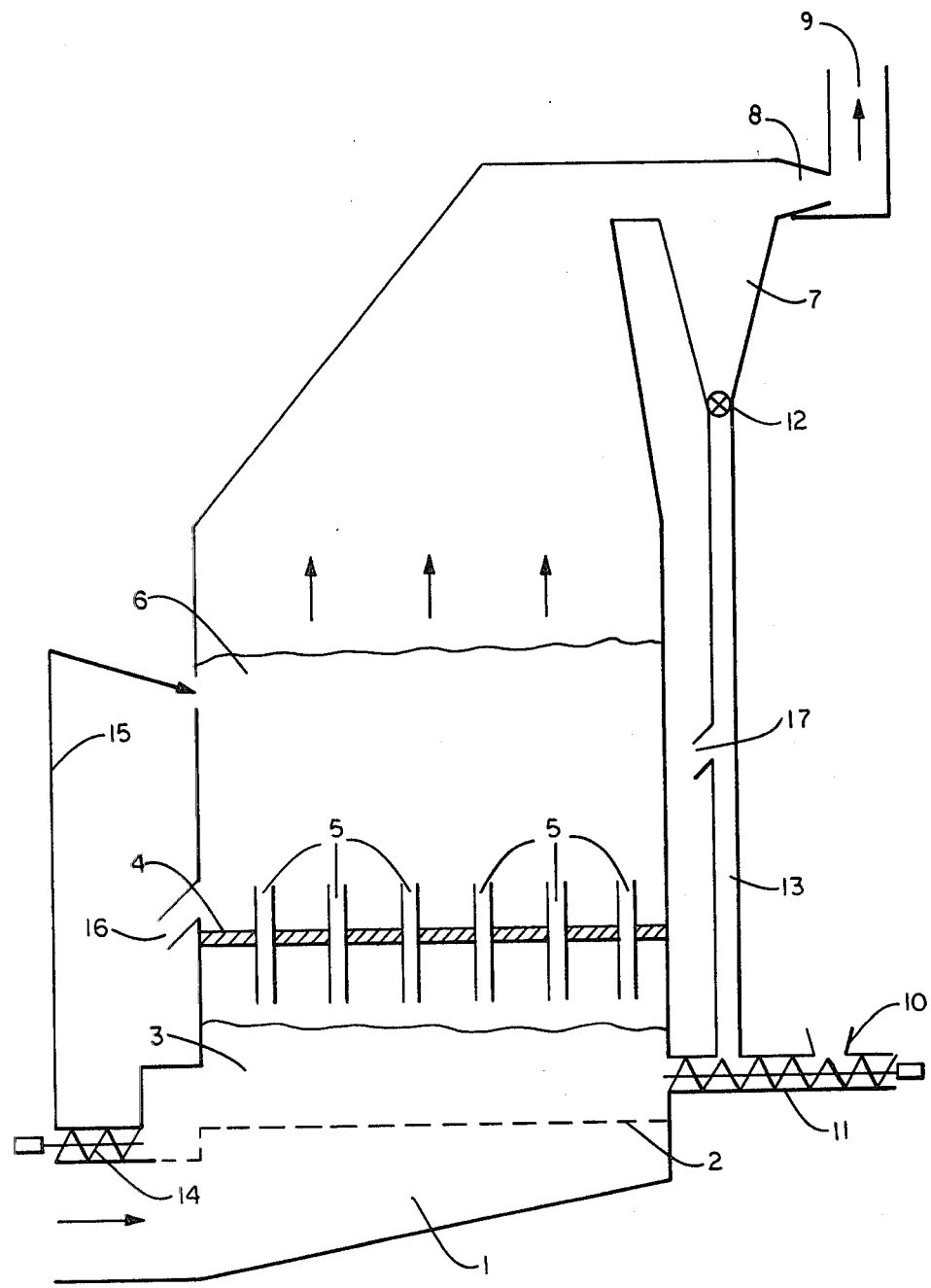
FIG. 1 is a schematic view of one embodiment of this invention showing a fluidized bed hearth including a fuel distributing bed hearth having a common combustion air and fuel supply.

In the version of the fluidized bed hearth according to FIG. 1, a stream of air is fed through channel 1 via a bottom gate 2 into a fuel distributing fluidized bed 3 where the whirling air stream fluidizes the solid fuel fed through conveying device 11 and raises the fluidized fine grains of the fuel through an array of connecting pipes 5 which are arranged in the bottom plate 4 of the combustion space of the hearth. The fluidized fine grains of the fuel are thus pneumatically conveyed through the pipes 5 into the fluidized combustion bed 6 in the combustion space and the conveying air is employed simultaneously as the combustion air. The gaseous combustion products together with flue dust enter upon the release of useful heat into a dust separator or collector 7. The purified exhaust gas is released via a ventilator 8 and a chimney 9 of the hearth.

The granular solid fuel is fed via a hopper 10 into the feeding or conveying device 11 which discharges the fuel into the fuel distributing space. The conveying device 11 is connected via a pipeline 13 to the outlet 12 of the dust separator 7 and the collected flue dust is admixed to the fuel and discharged therewith into the fuel distributing fluidized bed 3. Coarse grains of the fuel are withdrawn from the distributing bed 3 by means of a discharge device 14 and fed via a schematically illustrated feeding system 15 into the combustion fluidized bed 6. Ash in excess is discharged at the outlet 16 at the bottom of the combustion space and at the outlet 17 from the pipe 13.

Figure 2:
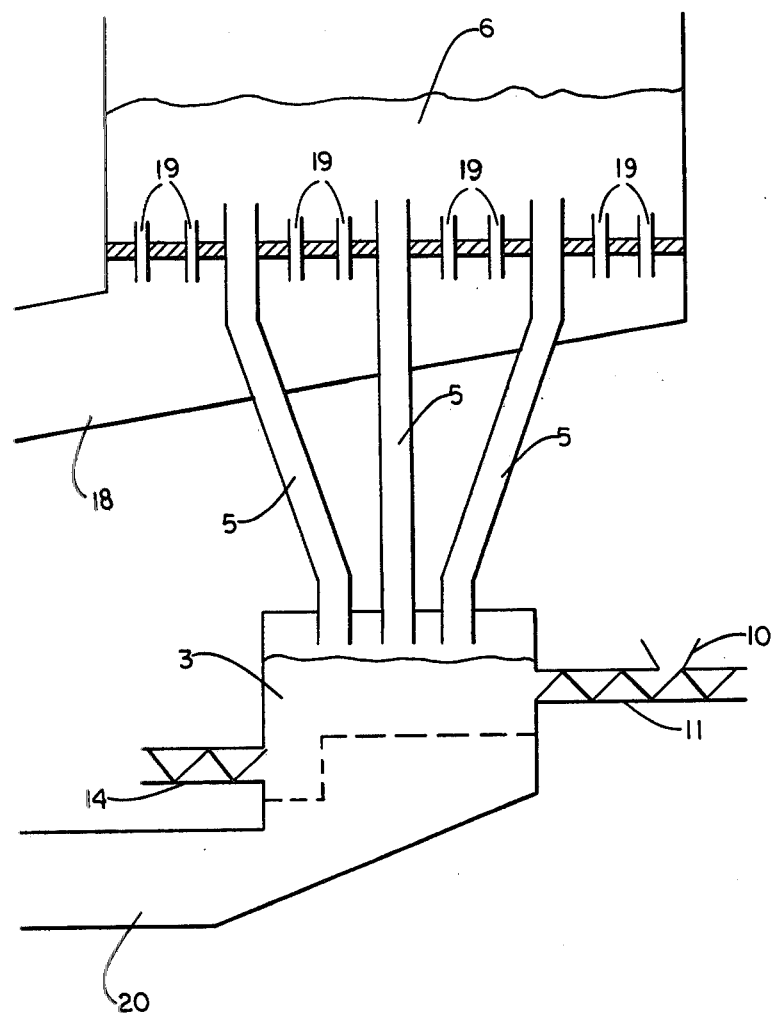
FIG. 2 is a schematic view of a cutaway part of another embodiment of the hearth of this invention having separate fuel and air supplies.

In the embodiment of fluidized bed hearths as illustrated in FIG. 2, combustion air is fed into the fluidized combustion bed 6 from a duct 18 to nozzles 19 in the bottom plate of the combustion space. The fuel conveying gas, however, is fed from a separate duct 20 into the fuel distributing fluidized bed 3 where it is loaded with the fine grain constituents of the fuel and in a fluidized state is fed through feeding pipes 5 into the combustion fluidized bed 6. The dust separator and the feeding system for coarser fuel grains and the other equipment of the hearth can be arranged similarly as those in FIG. 1.

As it is apparent from FIG. 2, the fuel distributing fluidized bed 3 does not need necessarily to be of the same size as the combustion fluidized bed 6. It is quite feasible to converge the feeding or connecting pipes 5 leading from a larger combustion bed 6 into a smaller fuel distributing bed 3.

Figure 3:
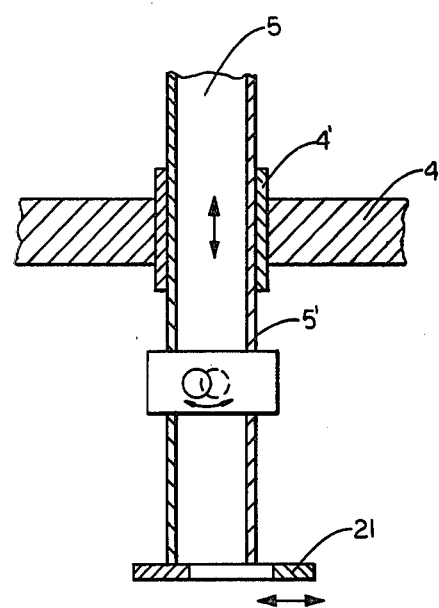
FIG. 3 shows a sectional view of a single conveying pipe according to this invention equipped with schematically indicated regulating devices.

FIG. 3 illustrates schematically one pipe 5 of the array of feeding or conveying pipes passing through the bottom plate 4 of the combustion space of the hearth. The feeding efficiency of the pipes 5 can be controlled, for example, by adjusting the depth of immersion of the pipe into the fuel distributing bed 3. For this purpose, the pipes are adjustable in axial direction in a bearing 4'. The feeding can be also controlled by opening or closing openings 5' in the pipe for admitting by-padded or infiltrated air. The feeding rate can also be controlled by closing or opening the inlet of the pipes 5 by means of a shiftable perforated cover 21 and the like.

Figure 4:
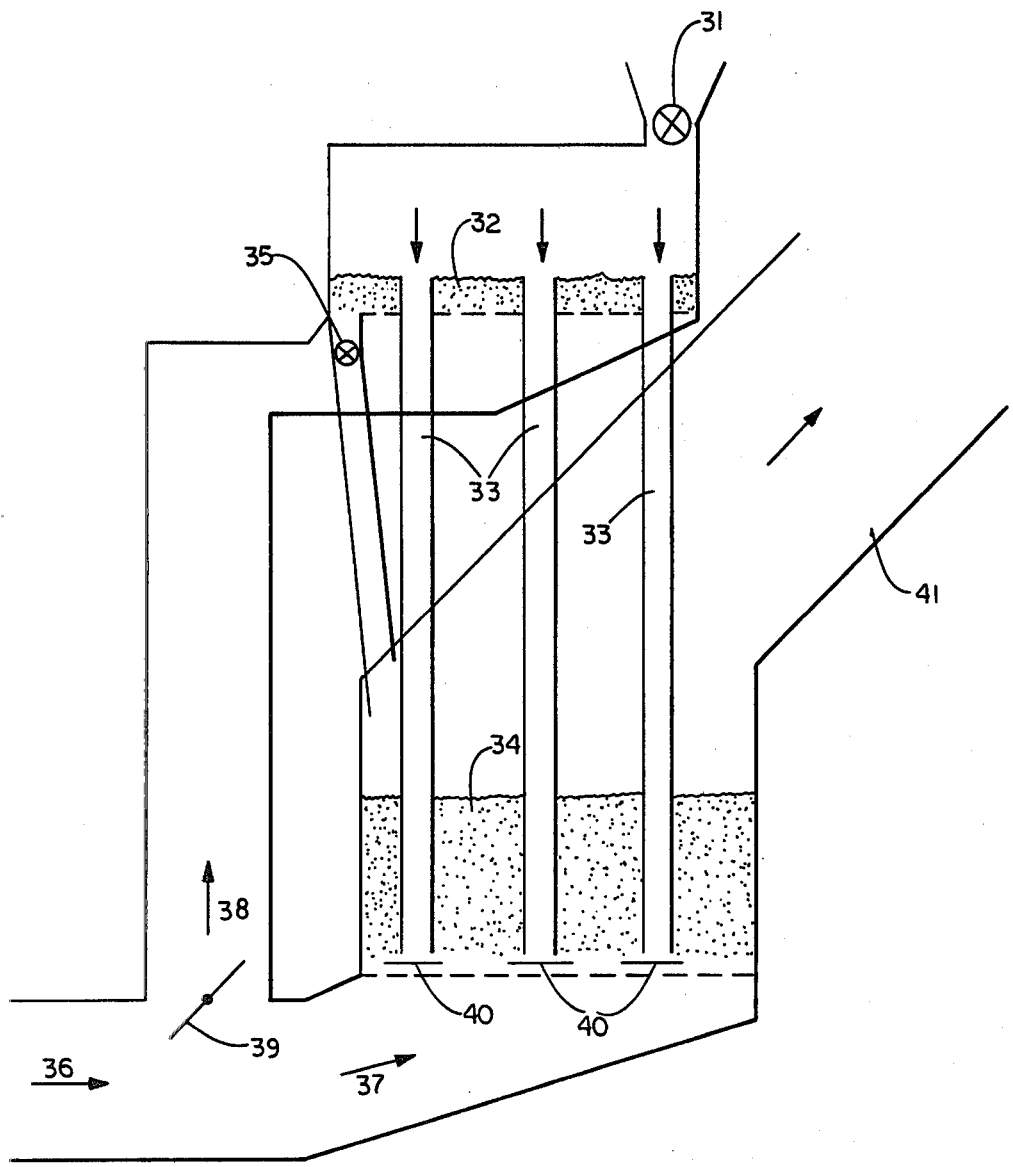
FIG. 4 is still another embodiment of the fluidized bed hearth of this invention.

In the embodiment of the fluidized bed hearth according to FIG. 4, the solid fuel grains are fed first via a dosing apparatus 31 such as for example a bucket wheel in the fuel distributing fluidized bed 32. An array of fuel feeding pipes 33 project from below into the fluidized fuel bed 32. The pipes 33 are uniformly distributed and act as overflow or gravity pipes through which the whirling coal grains fall by gravity into the underlying combustion fluidized bed 34. The feeding process is assisted by a stream of combustion and conveying air 36 which is branched by means of a flap valve 39 into a branch stream 37 or 38. The air stream 38 is fed through a bottom grate into the fuel distributing fluidized bed 32 and acts as a conveying fluid for the fuel particles passing through the feeding pipe 33. The other branch stream 37 is admitted via bottom grate directly into the combustion fluidized bed 34 where it acts as whirling or combustion air for firing or burning the fuel. The gaseous products for burning are discharged through duct 41.

Coarse fuel grains which may remain in the distributing fluidized bed 32 are discharged via a bucket wheel 35 and a return conduit into the combustion space above the combustion fluidized bed 34. The bottom openings of the feeding pipes 33 are arranged opposite deflector 40 mounted above the bottom grate of the combustion space.

It will be understood that each of the elements described above, or two or more together, may also find a useful application in other types of constructions differing from the types described above.

While the invention has been illustrated and described as embodied in specific examples of the fluidized bed hearth; it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for feeding granular solid fuel into a fluidized bed hearth having a fuel distributing space and a combustion space, comprising means for feeding the fuel into said fuel distributing space; means for admitting a whirling stream of conveying gas to said distributing space to form with the fine grains of fuel a first fluidized bed therein; an array of feeding pipes interconnecting said distributing space with said combustion space to pneumatically feed the fluidized fuel from said fuel distributing space into said combustion space and to form a combustion fluidized bed therein, said fuel distributing space being arranged above said combustion space, said feeding pipes extending downwardly from said fuel distributing space into said combustion space; a gas distributing duct system admitting streams of fuel conveying and combustion gas streams, said gas distributing duct system including a main duct having two duct branches communicating respectively with said fuel distributing space and said combustion space, said distributing space having a grated bottom to admit said whirl stream of gas to fluidize the fuel present in said distributing space and to overflow the fluidized fuel through said array of feeding pipes into said combustion space, and further including deflection elements arranged in said combustion space opposite the outlet openings of respective pipes.

2. A device as defined in claim 1, wherein at least one of said duct branches is provided with a control valve for controlling the amount of admitted gas stream.

3. A device as defined in claim 1, wherein said feeding pipes are made of a heat-resistant material.

4. A device as defined in claim 1, further including an additional conveying device connected between said fuel distributing space and said combustion space to feed coarse fuel gains from said distributing space into said combustion space.

5. A device as defined in claim 1, further comprising a fuel feeding device communicating with one side of said distributing space and a discharge device for coarse grains of the fuel located at another side of the distributing space.

6. A device as defined in claim 1, further including a fuel dust collector communicating with said combustion space and being connected to said fuel feeding device to recycle fuel dust into said fuel distributing space.

* * * * *